(12) United States Patent
Kawazoe et al.

(10) Patent No.: US 9,026,584 B2
(45) Date of Patent: May 5, 2015

(54) SERVER DEVICE, COMMUNICATION METHOD, AND PROGRAM PRODUCT FOR PROCESSING THE TRANSFER OF SCREEN CHANGES

(75) Inventors: Hiroshi Kawazoe, Kanagawa (JP); Takuya Kawamura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 447 days.

(21) Appl. No.: 13/412,697

(22) Filed: Mar. 6, 2012

(65) Prior Publication Data

US 2012/0246224 A1    Sep. 27, 2012

(30) Foreign Application Priority Data

Mar. 25, 2011    (JP) ................. 2011-067847

(51) Int. Cl.
  G06F 15/16    (2006.01)
  H04N 19/17    (2014.01)
  H04N 19/507    (2014.01)
(52) U.S. Cl.
  CPC ..... H04N 19/00581 (2013.01); H04N 19/0026 (2013.01)
(58) Field of Classification Search
  CPC ............... H04N 19/00581; H04N 19/0026; G06F 15/16
  USPC ............ 709/201–203; 382/118–305; 348/294
  See application file for complete search history.

(56) References Cited

U.S. PATENT DOCUMENTS 7,834,922 B2 * 11/2010 Kurane ................. 348/294
7,844,705 B2 * 11/2010 Jones et al. ................. 709/224
8,442,313 B2 *  5/2013 Kondo et al. ................. 382/167
8,559,743 B2 * 10/2013 Liege et al. ................. 382/254

(Continued)

FOREIGN PATENT DOCUMENTS

JP        07-302242       11/1995
JP        2002-252667      9/2002

(Continued)

OTHER PUBLICATIONS

Richardson, Tristan; "The RFB Protocol", Real VNC Ltd, Version 3.8, Nov. 2010, pp. 1-43.

(Continued)

Primary Examiner — Wing F. Chan
Assistant Examiner — Razu Miah
(74) Attorney, Agent, or Firm — Amin, Turocy & Watson, LLP (57) ABSTRACT

According to one embodiment, a server device includes a receiver, an acquisition unit, a difference extracting unit, an estimation unit, a determination unit, a compression unit, and a transmitter. The receiver receives manipulation information from a client device. The acquisition unit acquires a display image on which the manipulation information is reflected. The difference extracting unit extracts a region where pixel information on an image transmitted to the client device is not matched with pixel information on the display image. The estimation unit estimates an elapsed time since the manipulation information is received until the display image is acquired. The determination unit determines image quality, for which a response time is a predetermined value or less, on the basis of the elapsed time. The compression unit generates a compression image in which the image in the region is compressed with the determined image quality. The transmitter transmits the compression image.

5 Claims, 9 Drawing Sheets

(56) References Cited

U.S. PATENT DOCUMENTS

| | | | |
|---|---|---|---|
| 2002/0012471 A1* | 1/2002 | Nayyar | 382/239 |
| 2003/0055882 A1* | 3/2003 | Kawamura | 709/203 |
| 2004/0103143 A1* | 5/2004 | Chikada et al. | 709/203 |
| 2005/0219367 A1* | 10/2005 | Kanda et al. | 348/207.2 |
| 2005/0220188 A1* | 10/2005 | Wang | 375/240.03 |
| 2005/0238255 A1* | 10/2005 | Niwa et al. | 382/305 |
| 2006/0114326 A1* | 6/2006 | Tanaka | 348/207.11 |
| 2006/0274957 A1 | 12/2006 | Suzuki et al. | |
| 2007/0196005 A1* | 8/2007 | White et al. | 382/128 |
| 2009/0089455 A1* | 4/2009 | Nogawa et al. | 709/247 |
| 2009/0300167 A1* | 12/2009 | Jones et al. | 709/224 |
| 2010/0023578 A1* | 1/2010 | Brant et al. | 709/203 |
| 2010/0067788 A1* | 3/2010 | Kondo et al. | 382/165 |
| 2011/0055360 A1* | 3/2011 | Jones et al. | 709/219 |
| 2011/0085740 A1* | 4/2011 | Liege et al. | 382/254 |
| 2011/0311130 A1* | 12/2011 | Ichimori | 382/154 |

FOREIGN PATENT DOCUMENTS

| | | |
|---|---|---|
| JP | 2004-295605 | 10/2004 |
| JP | 2007-265207 | 10/2007 |

OTHER PUBLICATIONS

English Translation of Office Action of Notice of Rejection for Japanese Application No. 2011-067847 Dated Apr. 2, 2013, 5 pgs.

* cited by examiner

| No. | ACQUISITION START TIME (MILLISECOND) | TRANSMISSION COMPLETION TIME (MILLISECOND) | REGION INFORMATION | |
|---|---|---|---|---|
| 1 | 10000 | 10110 | (100, 100)-(320, 320) | ---1501 |
| 2 | 10110 | 10270 | (320, 200)-(540, 420) | ---1502 |
| 3 | 10270 | 10450 | (0, 0)-(640, 480) | ---1503 |

FIG.11

| IMAGE QUALITY Q | MEASURED VALUE OF AVERAGE COMPRESSION TIME PER UNIT PIXEL [UNIT: MILLISECOND] |
|---|---|
| 20 | $10 \times 10^{-6}$ |
| 40 | $15 \times 10^{-6}$ |
| 60 | $20 \times 10^{-6}$ |
| 80 | $50 \times 10^{-6}$ |
| 100 | $100 \times 10^{-6}$ |

FIG.12

| RANGE OF IMAGE QUALITY Q | EA (Q) OF AVERAGE COMPRESSION TIME PER UNIT PIXEL [UNIT: MILLISECOND] |
|---|---|
| $0 < Q \leq 40$ | $(0.25 \times Q + 5) \times 10^{-6}$ |
| $40 < Q \leq 60$ | $(0.25 \times Q + 5) \times 10^{-6}$ |
| $60 < Q \leq 80$ | $(1.5 \times Q - 70) \times 10^{-6}$ |
| $80 < Q$ | $(2.5 \times Q - 150) \times 10^{-6}$ |

| RANGE OF IMAGE QUALITY Q | EQUATION FOR ESTIMATED VALUE R OF RESPONSE TIME [UNIT: MILLISECOND] |
|---|---|
| 0<Q≤40 | 3.763 × Q+211.5 |
| 40<Q≤60 | 3.763 × Q+211.5 |
| 60<Q≤80 | 4.147 × Q+188.5 |
| 80<Q | 4.454 × Q+163.9 |

SERVER DEVICE, COMMUNICATION METHOD, AND PROGRAM PRODUCT FOR PROCESSING THE TRANSFER OF SCREEN CHANGES

CROSS-REFERENCE TO RELATED APPLICATION

This application is based upon and claims the benefit of priority from Japanese Patent Application No. 2011-067847, filed on Mar. 25, 2011; the entire contents of which are incorporated herein by reference.

FIELD

Embodiments described herein relate generally to a server, a communication method, and a program product.

BACKGROUND

There is known a screen transfer system that distributes packetized screen information on a server terminal (server device) in real time from the server device to plural client terminals (client devices), which are connected to the server device through a network. The client device receives and displays screen information in a whole or part of a screen region possessed by the server device. Information on a user's manipulation performed by the client device is transmitted to the server device. The screen transfer system is expected to be applied to various uses such as a remote monitoring system because the screen information on the remote server device can be displayed and referred to by the device in front of the user.

In constructing the screen transfer system, there are two methods, namely, a method for packetizing contents of the whole screen region possessed by the server device at constant time intervals and distributing the contents to each client device, and a method for distributing only information on a difference between drawing states and information on the region where the change is generated every time the change in drawing state is generated in the screen region. In the difference distributing method, because only data of the necessary part is generated according to the change in drawing state, a network band can be efficiently utilized compared with the former method. In the latter method, there is an advantage that the number of drawing frames per unit time can be increased. Accordingly, a service constructed by the latter method is generally provided.

The information indicating the difference for acquiring the latest drawing state in the screen region is referred to as a screen update. The latest drawing state can be acquired by reflecting the screen update on a frame buffer in which the last drawing state is stored.

In the screen transfer system, it is necessary to achieve a balance between image quality and a responsive property. Particularly, in the case that the screen information acquired by the server device is transmitted to the client device without degradation in an environment having insufficient communication quality, such as communication between remote bases, a time necessary for the transmission is significantly lengthened. This is because the amount of data to be transmitted is large for a utilizable band width. As a result, a time (response time) since some sort of manipulation is performed in the client device until the screen change on the server device corresponding to the manipulation is reflected in the client device is lengthened. That is, the responsive property is degraded. On the other hand, the responsive property is improved when the screen information is subjected to compression processing to reduce the data amount of the transmission. However, user's visibility is impaired because a compression method such as JPEG is accompanied with the degradation of the image quality. Thus, usually there is a trade-off relationship between the image quality and the responsive property.

There is known a method for not impairing the operability and the visibility by selecting the image quality of the screen information according to a communication rate of an acquired communication channel.

DETAILED DESCRIPTION

In general, according to one embodiment, a server device includes a receiver, an acquisition unit, a difference extracting unit, an estimation unit, a determination unit, a compression unit, and a transmitter. The receiver receives manipulation information from a client device. The acquisition unit acquires a display image on which the manipulation information is reflected. The difference extracting unit extracts a region where pixel information on an image transmitted to the client device is not matched with pixel information on the display image. The estimation unit estimates an elapsed time since the manipulation information is received until the display image is acquired. The determination unit determines image quality, for which a response time is a predetermined value or less, on the basis of the elapsed time. The compression unit generates a compression image in which the image in the region is compressed with the determined image quality. The transmitter transmits the compression image.

Hereinafter, a server device according to an embodiment will be described in detail.

The server device of the embodiment refers to a history of a past processing time to estimate an elapsed time (processing start waiting time) since manipulation information by which a screen change is generated is received until processing of an image corresponding to the manipulation information is started. The server device determines the image quality during image processing, by which a desired response time can be achieved, according to the estimated processing start waiting time. Therefore, a predetermined response time is obtained and the degradation of the image quality is suppressed to the minimum level.

Figure 1:
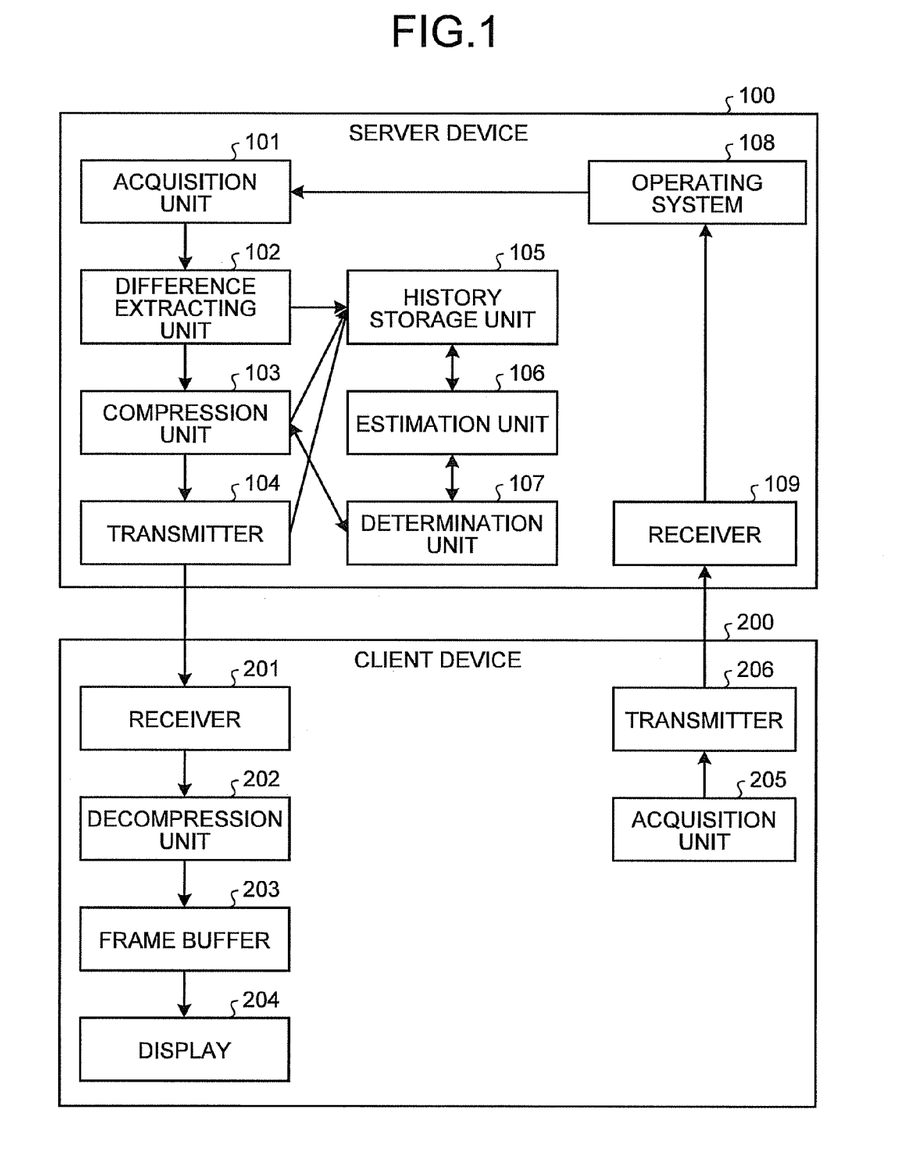
FIG. 1 is a diagram illustrating a configuration of a screen transfer system including a server device.

FIG. 1 is a diagram illustrating an example of a configuration of a screen transfer system including a server device 100 of the embodiment. As illustrated in FIG. 1, in the screen transfer system of the embodiment, the server device 100, which is an information processing apparatus acting as a server, and a client device 200, which is an information processing apparatus acting as a client, are connected to each other through a network. Any network can be used for connecting the server device 100 and the client device 200. For example, the Internet or a LAN (Local Area Network) can be adopted as the network The server device 100 includes an acquisition unit 101, a difference extracting unit 102, a compression unit 103, a transmitter 104, a history storage unit 105, an estimation unit 106, a determination unit 107, an operating system 108, and a receiver 109.

The acquisition unit 101 acquires the screen information of a display image displayed in a whole screen region of the server device 100 from the operating system 108 in arbitrary timing. The display image is an image, on which manipulation information indicating a manipulation input to the client device 200 by a user is reflected. For example, the acquisition unit 101 calls a predetermined API to acquire the screen information on the display image, thereby acquiring the screen information.

The difference extracting unit 102 extracts a region where pixel information on a transmission image, which has been previously transmitted to the client device 200, is not matched with pixel information on the display image. For example, the difference extracting unit 102 extracts a difference between the screen information acquired by the acquisition unit 101 and the last acquired screen information. The difference extracting unit 102 includes a storage region (frame buffer) in which the screen information on the whole screen region is stored, and the difference extracting unit 102 stores the screen information received from the acquisition unit 101 in the frame buffer. The difference extracting unit 102 outputs information indicating the difference acquired from the last stored information as a screen update every time the difference extracting unit 102 receives the screen information from the acquisition unit 101.

Figure 2:
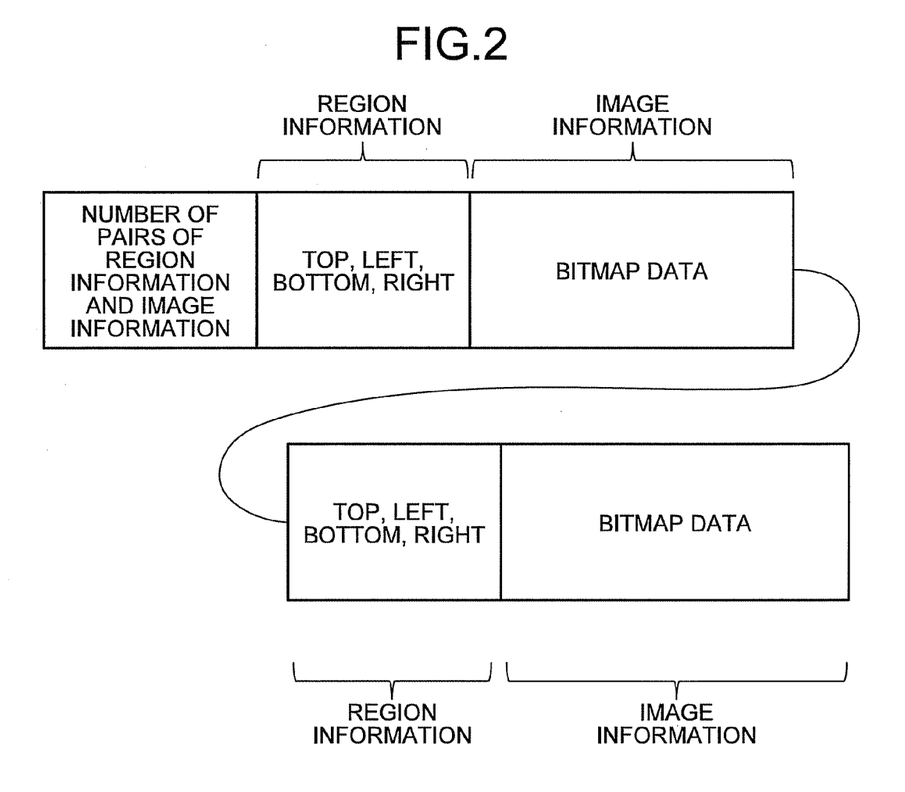
FIG. 2 is a diagram illustrating a data structure of a screen update.

FIG. 2 is a diagram illustrating an example of a data structure of the screen update. The screen update includes at least one pair of region information and image information. The region information indicates a position of the region to be updated. The image information is information on the region thus updated. The image information is a rectangular bitmap data (such as three color values of red, green, and blue in each rectangular pixel), which corresponds to part of a screen region. The region information is a numerical value (numerical value expressing a storage position in storing the updated image in the frame buffer) indicating the position at which the image information is displayed in the screen region.

Figure 3:
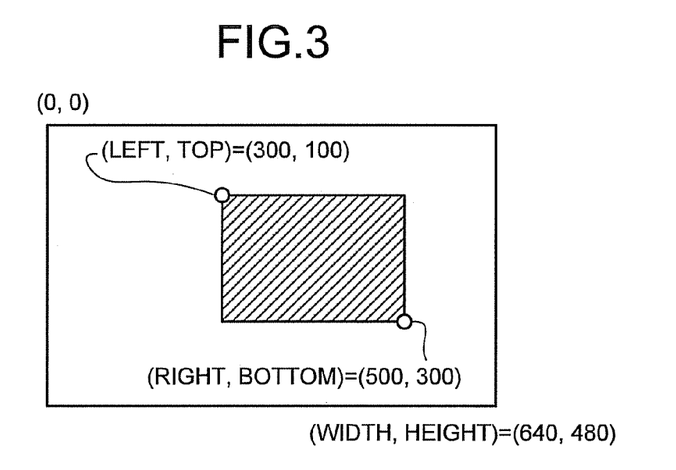
FIG. 3 is a diagram illustrating an example of a region to be updated.

FIG. 3 is a diagram illustrating an example of the region to be updated. As illustrated in FIG. 3, for example, assuming that (0,0) is an upper-left corner of the screen region and (Width,Height) is a lower-right corner, the region information is a combination of an upper-left coordinate (Left,Top) and a lower-right (Right,Bottom) of the display position. The screen update also includes the number of pairs of the region information and the image information.

Referring to FIG. 1, the compression unit 103 performs compression processing to the image information included in the screen update by a predetermined compression method such as JPEG. The compression unit 103 includes a storage region in which image quality information is stored. For example, in the JPEG, the image information is quality represented by a value from 1 to 100 in steps of 1. The compression unit 103 performs the compression processing on the basis of the designated image quality information.

The transmitter 104 converts the input screen update into a form in which the screen update can be transmitted on the network, and transmits the converted screen update to the client device 200. When completing the transmission processing, the transmitter 104 notifies the acquisition unit 101 such that the acquisition unit 101 starts the processing of acquiring the next screen information.

The history storage unit 105 includes a storage region in which a history of the screen update produced in past times is stored. Pieces of information such as a time the processing of acquiring the screen information is started, a time the transmission processing is completed, and the region information are stored in the history. The history storage unit 105 includes any storage medium, such as an HDD (Hard Disk Drive), an optical disk, a memory card, and a RAM (Random Access Memory), which are usually used.

The estimation unit 106 estimates the processing start waiting time on the basis of the history of the screen update stored in the history storage unit 105. The processing start waiting time means an elapsed time since the manipulation information indicating the user's manipulation is received to generate the screen change corresponding to the manipulation information in the operating system 108 until the acquisition unit 101 acquires the image (display image) on which the screen change is reflected.

On the basis of the processing start waiting time estimated by the estimation unit 106, the determination unit 107 determines the image quality of a maximum limitation such that the response time falls within a predetermined value.

The operating system 108 provides basic functions, such as an input/output function and function of managing a disk or a memory which are commonly utilized in many applications, and a desktop environment. Each function is provided through an API. For example, the operating system 108 provides an API for acquiring the screen information on the desktop, an API for synthesizing an input manipulation of keyboard or mouse, and an API for acquiring a current time.

The receiver 109 receives the manipulation information from the client device 200 through the network.

An example of a configuration of the client device 200 will be described below. The client device 200 includes a receiver 201, a decompression unit 202, a frame buffer 203, a display 204, an acquisition unit 205, and a transmitter 206.

The receiver 201 receives the screen update from the server device 100 through the network. The decompression unit 202 performs decompression processing to the compressed image information (compressed image) included in the screen update. The frame buffer 203 includes a storage region in which the screen information on the whole screen region is stored, and the frame buffer 203 updates the information on the storage region indicated by the region information using the image information when receiving the screen update. The display 204 displays the information stored in the frame buffer 203. The acquisition unit 205 receives the input manipulation from the user. The transmitter 206 transmits the manipulation information indicating the input manipulation to the network.

Figure 4:
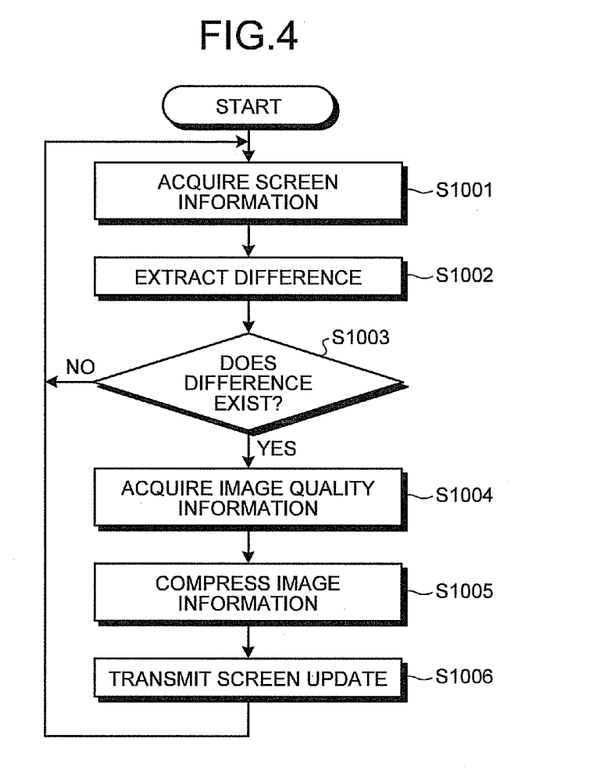
FIG. 4 is a flowchart illustrating an entire flow of screen transfer processing.

The screen transfer processing performed by the server device 100 of the embodiment will be described with reference to FIG. 4. FIG. 4 is a flowchart illustrating an entire flow of the screen transfer processing of the embodiment.

The server device 100 and the client device 200 are physically connected through the network. In the embodiment, it is assumed that the network is an IP (Internet Protocol) network.

While the screen transfer is not performed, the operating system 108 properly updates a screen state according to the operating state of the operating system 108 or each application, which is performed in the server device 100. When the screen transfer is started, the acquisition unit 101 performs processing of acquiring the screen update.

Figure 5:
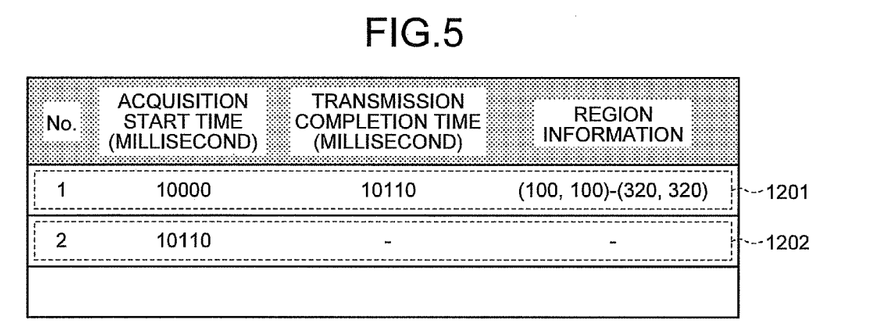
FIG. 5 is a diagram illustrating an example of a structure of data stored in a history storage unit.

The acquisition unit 101 calls the API that is provided by the operating system 108 to acquire a current time, and the acquisition unit 101 outputs the acquired value as an acquisition start time of the screen information to the history storage unit 105. FIG. 5 is a diagram illustrating an example of a structure of the data stored in the history storage unit 105. As illustrated in FIG. 5, the data is stored in the history storage unit 105 while the acquisition start time, the transmission completion time, and the region information are correlated with one another. The history storage unit 105 produces a new entry to record the acquisition start time every time the history storage unit 105 receives an input. FIG. 5 illustrates the state after "10110" is received as the acquisition start time while an entry 1201 indicated by No. 1 is already stored. At this point, a new entry 1202 is produced as No. 2 to record the acquisition start time.

Referring to FIG. 4, the acquisition unit 101 acquires the screen information by calling the API for acquiring the screen information on the desktop (Step S1001). The acquisition unit 101 outputs the acquired screen information to the difference extracting unit 102.

When the screen information is input, the difference extracting unit 102 compares the input screen information to the screen information in the frame buffer thereof, and extracts part (region) having a different content (pixel value) as the difference (Step S1002). At the time immediately after the screen transfer is started, the screen information on the whole frame buffer is extracted as the difference. The difference extracting unit 102 determines whether the difference is extracted (Step S1003). When the difference does not exist (No in Step S1003), namely, when the screen information in the frame buffer is completely identical to the input screen information, the acquisition unit 101 issues an instruction to delete the latest entry (No. 2 in the example of FIG. 5) to the history storage unit 105. Then the acquisition unit 101 waits for a given time (for example, 30 milliseconds) and returns to Step S1001 to repeat the processing.

Figure 6:
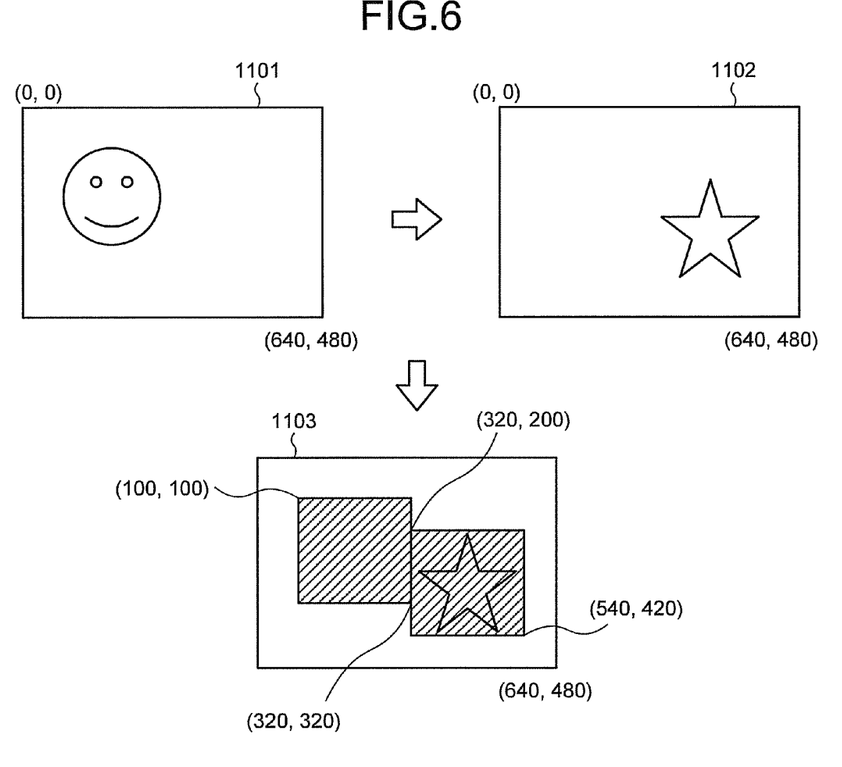
FIG. 6 is a diagram illustrating an example of the screen update.

When the difference exists (Yes in Step S1003), the difference extracting unit 102 outputs the screen update to the compression unit 103. FIG. 6 is a diagram illustrating an example of the screen update. It is assumed that the frame buffer has resolution of 640×480, and it is assumed that screen information 1102 is input with respect to screen information 1101 stored in the frame buffer. In this case, the difference corresponds to the pieces of region information on Left=100, Top=100, Right=320, and Bottom=320 and the pieces of region information on Left=320, Top=200, Right=520, and Bottom=420. The difference extracting unit 102 produces pairs of the pieces of region information and the corresponding pieces of image information as the screen update. When the production of the screen update is ended, the difference extracting unit 102 outputs the screen update to the compression unit 103 to make a request to compress the screen update.

Referring to FIG. 4, the compression unit 103 makes a request to acquire the image quality information to the determination unit 107 when receiving the screen update (Step S1004). The determination unit 107 sends back the image quality information stored in the storage region thereof. The compression unit 103 compresses the image information on the basis of the image quality information (Step S1005). When completing the compression processing, the compression unit 103 outputs the screen update including the region information and the compressed image information to the transmitter 104.

When receiving the screen update, the transmitter 104 adds a TCP/IP header to the screen update to convert the screen update into the form in which the screen update can be transmitted on the network, and then the transmitter 104 transmits the screen update to the client device 200 (Step S1006). The transmitted screen update is received by the receiver 201 of the client device 200. When the transmission is completed, the transmitter 104 calls the API for acquiring the current time and records the acquired value as the transmission completion time in the history storage unit 105. The transmitter 104 records the region information included in the transmitted screen update in the history storage unit 105.

Figure 7:
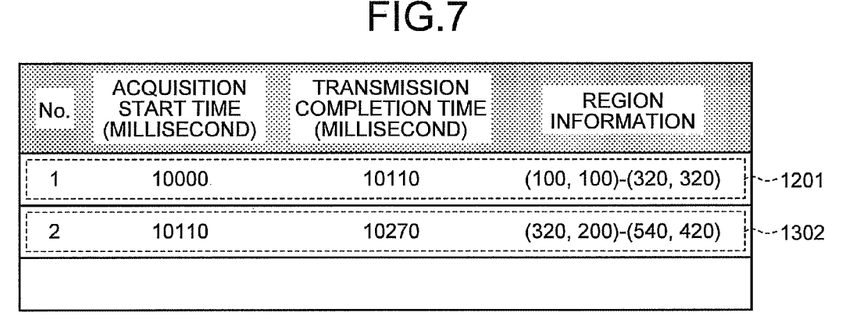
FIG. 7 is a diagram illustrating an example of the history storage unit.

FIG. 7 is a diagram illustrating an example of the history storage unit 105 after the above-described processing is performed. An entry 1302 of FIG. 7 corresponds to an entry in which the transmission completion time and the region information are added to the entry 1202 of FIG. 5.

Then the transmitter 104 makes a request to acquire the next screen information to the acquisition unit 101. The processes starting from Step S1001 are repeated.

The screen update processing performed by the client device 200 that receives the screen update will be described below. When receiving the screen update through the network, the receiver 201 of the client device 200 removes the provided TCP/IP from the screen update, and outputs the screen update to the decompression unit 202 to makes a request to decompress the image information. When receiving the screen update, the decompression unit 202 decompresses the compressed image information. The decompression unit 202 outputs the screen update including the post-decompression image information to the frame buffer 203. When receiving the screen update, the frame buffer 203 updates the information on the storage region indicated by the region information using the image information. The information on the frame buffer 203 is displayed on the display 204.

The flow of the processing until the screen update is reflected in the client device 200 since the server device 100 acquires the screen update is described above.

Figure 8:
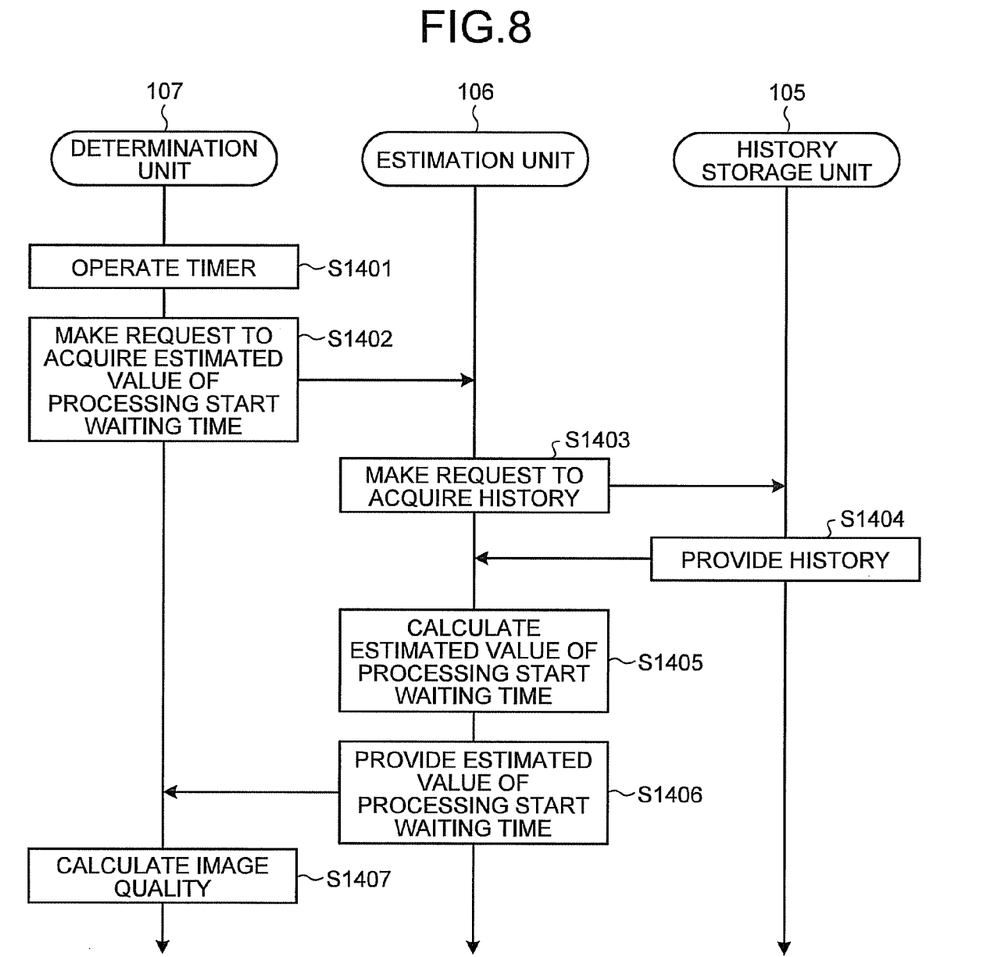
FIG. 8 is a flowchart illustrating an entire flow of image quality determining processing.

A flow of image quality determining processing performed by the determination unit 107 will be described below with reference to FIG. 8. FIG. 8 is a flowchart illustrating an entire flow of the image quality determining processing of the embodiment.

A timer that generates a signal in periodic timing is operated in the determination unit 107, and the determination unit 107 performs the following processing in each operation of the timer (Step S1401).

The determination unit 107 issues an instruction to estimate the processing start waiting time to the estimation unit 106 (Step S1402). When receiving the instruction, the estimation unit 106 estimates the processing start waiting time.

The processing start waiting time means the elapsed time since the screen change corresponding to the user's manipulation is generated until the acquisition unit 101 acquires the screen change.

Figure 9:
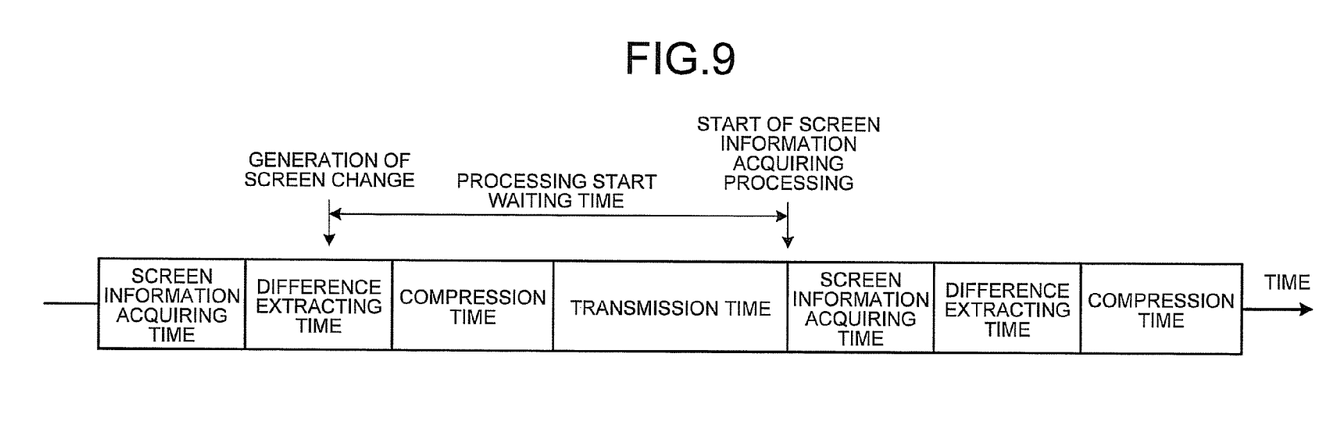
FIG. 9 is a diagram illustrating a processing start waiting time.

FIG. 9 is a diagram, illustrating the processing start waiting time. In FIG. 9, the times necessary for the acquisition of the screen information, the extraction of the difference, the compression, and the transmission are sequentially arrayed with respect to a temporal axis. The pieces of processing from the processing of acquiring the next screen information are repeated after the transmission processing is ended.

It is assumed that contents of the screen are changed in the operating system 108 by the user's manipulation at a time "generation of screen change" indicated by an arrow on the left of FIG. 9. At this point, actually the screen information including the screen change is acquired at not the time "generation of screen change" but a time "start of screen information acquiring processing" indicated by an arrow on the right of FIG. 9. The estimation unit 106 calculates an estimated value of a time interval between the two arrows.

Referring to FIG. 8, a processing start waiting time estimating procedure performed by the estimation unit 106 is illustrated. The estimation unit 106 makes a request to output all the stored entries to the history storage unit 105 (Step S1403). After outputting all the entries (Step S1404), the history storage unit 105 deletes all the entries from the storage region.

Figure 10:
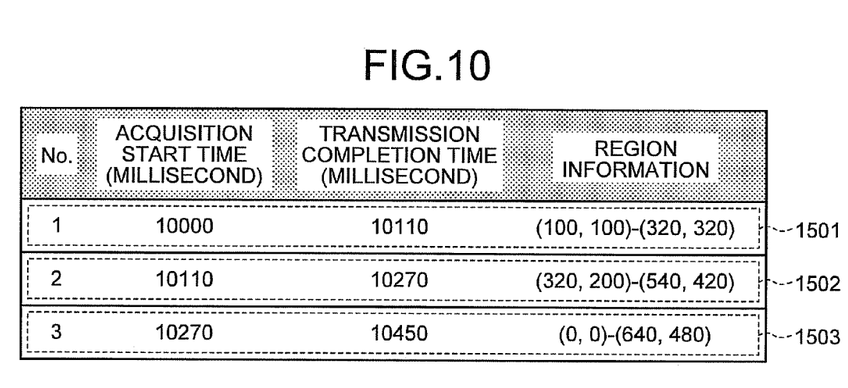
FIG. 10 is a diagram illustrating an example of a history acquired by an estimation unit.

The estimation unit 106 calculates a difference between the transmission completion time and the acquisition start time for each entry, and sets the maximum value in the calculated differences in the estimated value of the processing start waiting time (Step S1405). FIG. 10 is a diagram illustrating an example of the history acquired by the estimation unit 106. In the example of FIG. 10, the difference between the transmission completion time and the acquisition start time for an entry 1501 (No. 1) is 10100−10000=110, the difference for an entry 1502 (No. 2) is 10270−10110=160, and the difference for an entry 1503 (No. 3) is 10450−10270=180. Therefore, 180 (milliseconds) that is of the maximum value is the estimated value of the processing start waiting time. The estimation unit 106 returns the estimated value to the determination unit 107 (Step S1406). The value calculated by this method corresponds to the maximum value of the time interval during which the server device 100 performs the screen information acquiring processing. The maximum value is regarded as the processing start waiting time because the point (the arrow on the left of FIG. 9) at which the screen change is generated on the temporal axis cannot be foreseen.

It is not always necessary that the maximum value of the difference between the transmission completion time and the acquisition start time be set in the estimated value of the processing start waiting time. For example, an average value of the differences between the transmission completion times and the acquisition start times may be set in the estimated value. Alternatively, only the acquisition start times may be recorded in the history storage unit 105 and the maximum value of the recorded time interval may be set in the estimated value of the processing start waiting time. In this case, the amount of data to be recorded in the history storage unit 105 can be reduced. In the configuration in which both the transmission completion time and the acquisition start time are stored, the processing start waiting time can be calculated with higher accuracy. In FIG. 10, the acquisition start times of Nos. 2 and 3 are matched with the transmission completion times of Nos. 1 and 2, respectively. Even if the acquisition start times of Nos. 2 and 3 are not matched with the transmission completion times of Nos. 1 and 2, the processing start waiting time can be correctly calculated.

Referring to FIG. 8, when receiving the estimated value of the processing start waiting time, the determination unit 107 determines the image quality using the estimated value (Step S1407). Hereinafter, the input estimated value of the processing start waiting time is referred to as W [unit: second]. The determination unit 107 has a "guaranteed value of response time" RG as a parameter. The guaranteed value of response time is a value that guarantees the response time to be suppressed to the guaranteed value of response time or less even if any screen change is generated. The guaranteed value of response time may be described statically in the determination unit 107, or the guaranteed value of response time may be directly designated (the numerical value is designated by the user) or indirectly designated (one of a "image quality priority mode" and a "responsive property priority mode" correlated with specific numerical values is selected by the user) by the user through GUI or the like. The determination unit 107 determines which image quality is selected to cause the response time to fall within the guaranteed value even if any screen change is generated, and the determination unit 107 sets the selected image quality in a determined value of the image quality. In order to make the determination, the determination unit 107 calculates the response time estimating value R [unit: second] using the following equation (1) when certain image quality is selected.

$$\begin{aligned}\text{(estimated value } R \text{ of response time)} = \quad &(1)\\ \text{(estimated value } W \text{ of processing start waiting time)} + \\ \text{(estimated value } G \text{ of screen information acquired time)} + \\ \text{(estimated value } D \text{ of difference extracting time)} + \\ \text{(estimated value } E \text{ of compression time)} + \\ \text{(estimated value } T \text{ of transmission time)} \end{aligned}$$

In the equation (1), the compression time and the transmission time of the right side are values that depend on the image quality. The determination unit 107 estimates each time as described below.

The determination unit 107 directly uses the value returned from the estimation unit 106 as the estimated value W of the processing start waiting time.

It is assumed that a sum G+D (the estimated value G of the screen information acquiring time+the estimated value D of the difference extracting time) is described as a static constant in the determination unit 107. Alternatively, arbitrary default values may be set at the time immediately after the screen transfer is started, and thereafter the screen information acquiring time and the difference extracting time may be actually measured in arbitrary timing to refresh the value of G+D. In this case, before the screen information is acquired, the acquisition unit 101 calls the API provided by the operating system 108 to acquire the current time, and transfers a set of the acquired value and the screen information to the difference extracting unit 102. The difference extracting unit 102 calls the API to acquire the current time again when the difference extraction is completed, and obtains the difference between the two times, which allows the sum of the screen information acquiring time and the difference extracting time to be obtained. The difference extracting unit 102 transfers the sum to the determination unit 107 through the compression unit 103. Therefore, the determination unit 107 can acquires the measured value of the sum of the screen information acquiring time and the difference extracting time.

For the estimated value E of the compression time, it is assumed that an average compression time EA(Q) per unit pixel [unit: second] for a selected certain image quality Q is described as a static function in the determination unit 107. The determination unit 107 acquires the number of pixels of the whole screen of the server device 100 using the API provided by the operating system 108, multiplies the acquired number of pixels by EA(Q), and sets the product in the estimated value of the compression time. That is, the compression time for the screen update of the maximum size possibly generated by the server device 100 is regarded as the estimated value of the compression time. Alternatively, a value other than the static value may be used as the average compression time EA(Q). For example, an arbitrary default value may be set at the time immediately after the screen transfer is started, and thereafter the compression may be performed for each image quality on a trial basis in arbitrary timing, and the consumed compression time may be stored and used as the value of EA(Q) for each value of Q. The stored value may be refreshed by regularly performing such tests.

For the estimated value T of the transmission time, it is assumed that an average compression ratio CA(Q) [unit: %] for a selected certain image quality is described as a static function in the determination unit 107. It is also assumed that a transmission rate S [unit: byte/s] of the transmitter 104 is described as a static constant in the determination unit 107. The determination unit 107 acquires the number of pixels of the whole screen of the server device 100 using the API provided by the operating system 108, multiplies the acquired number of pixels by the number of bytes per pixel (for example, 3 bytes per pixel) to obtain a pre-compression data size of the whole screen. The determination unit 107 multiplies the pre-compression data size by the compression ratio CA(Q) to obtain a post-compression data size. The determination unit 107 divides the post-compression data size by the transmission rate S to set the quotient in the estimated value T of the transmission time. That is, the transmission time for the screen update of the maximum size possibly generated by the server device 100 is regarded as the estimated value of the transmission time.

A function other than the static function may be used as the average compression ratio CA(Q). For example, an arbitrary default value may be set at the time immediately after the screen transfer is started, the compression may be performed for each image quality on a trial basis in arbitrary timing, and the consumed compression time may be stored and used as the value of CA(Q) for each value of Q. The value may be refreshed by regularly performing such tests. A value other than the static value may be used as the transmission rate S. An arbitrary default may be set at the time immediately after the screen transfer is started, and a result of the transmission rate measured by an arbitrary method may be stored and used. The stored value may be refreshed by regularly performing such measurements.

In the embodiment, in estimating the compression time and the transmission time, the number of pixels of the whole screen is acquired to determine the estimated values on the basis of the acquired number of pixels. However, it is not always necessary to acquire the number of pixels of the whole screen. For example, the histories of the numbers of pixels of the screen updates received in past times may be separately stored as an average value in the history storage unit 105, and the determination unit 107 may read and use the stored history of the number of pixels. Alternatively, the determination unit 107 may read and use the number of pixels possessed by the latest entry of the history of the screen update stored in the history storage unit 105.

The determination unit 107 can calculate the estimated value R of the response time by the above described method. As described above, the estimated value R of the response time is determined by the selected image quality. The determination unit 107 selects an upper limit of the image quality such that the estimated value R of the response time falls within the guaranteed value RG of the response time. Because the response time is usually correlated with the image quality on a one-to-one basis, the image quality is easily selected.

An example of processing in determining the image quality will be described below. It is assumed that the determination unit 107 estimates the sum of the screen information acquiring time and the difference extracting time, the compression time, and the transmission time in the following manner.

For the sum G+D of the screen information acquiring time and the difference extracting time, it is assumed that the static constant G+D=30 [unit: millisecond] is used.

Figure 11:
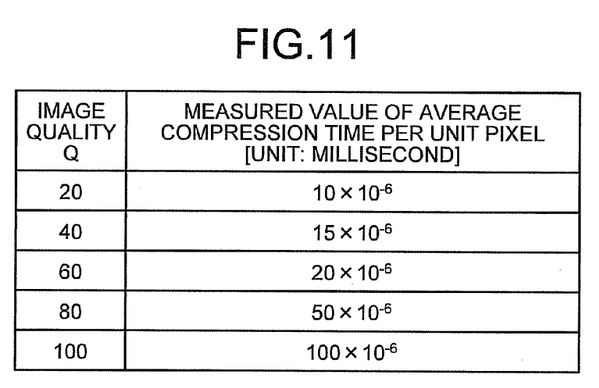
FIG. 11 is a diagram illustrating an example of a result of tentative measurement.

For the estimated value E of the compression time, it is assumed that the average compression time EA(Q) per unit pixel for a selected certain image quality Q (a value from 1 to 100 in steps of 1) is obtained by the tentative measurement performed at the time immediately after the screen transfer is started. FIG. 11 is a diagram illustrating an example of a result of the tentative measurement. In the example of FIG. 11, measurements are performed not for all the pieces of image quality Q but for only some pieces of image quality Q. In the embodiment, a function obtained by connecting the measured values with a straight line segments is set for the estimation of the average compression time EA(Q).

Figure 12:
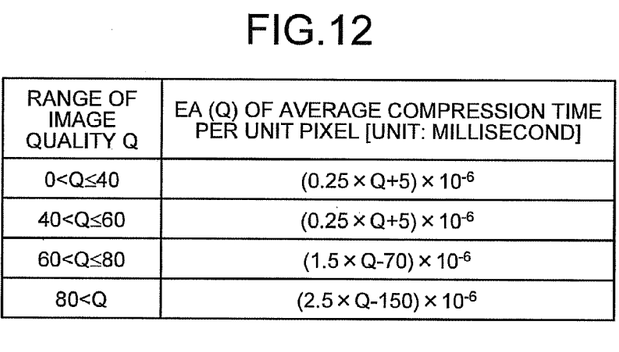
FIG. 12 is a diagram illustrating equations for average compression times EQ(A)
Figure 13:
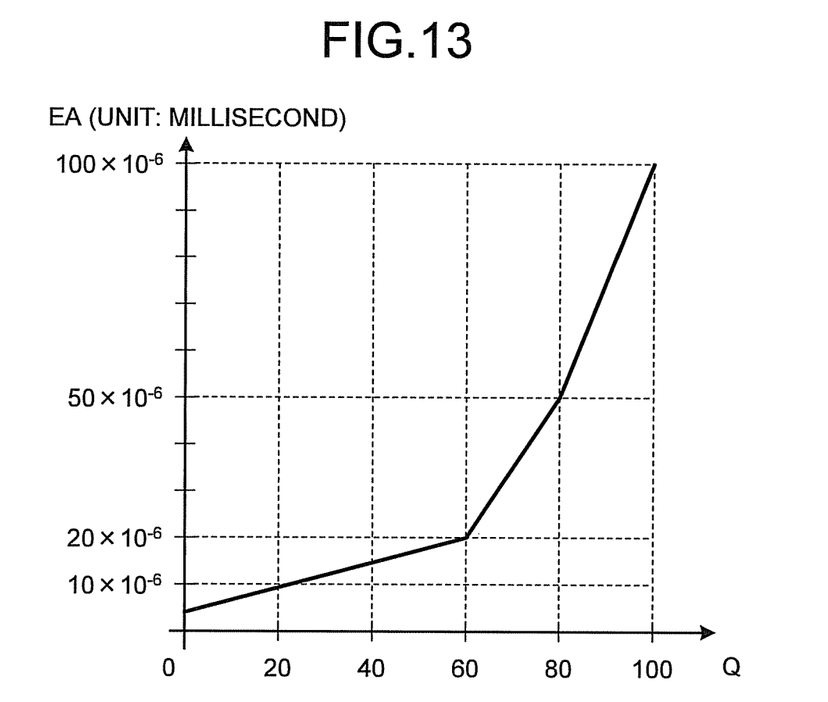
FIG. 13 is a graph illustrating equations of FIG. 12.

FIG. 12 is a diagram illustrating equations for the average compression times EQ(A), which are obtained from the measured values of FIG. 11. FIG. 13 is a graph illustrating equations of FIG. 12. It is assumed that the determination unit 107 uses (estimated value E of compression time)=(the number of pixels of the whole screen)×EA(Q).

It is assumed that T=(the number of pixels of the whole screen)×(the number of bytes per pixel)×(CA(Q)÷100)÷S is used as the estimated value T of the transmission time. The average compression ratio CA(Q) for a selected certain image quality Q (a value from 1 to 100 in steps of 1) is set in the static function CA(Q)=0.5×Q [unit: %] and used in the above equation. The transmission rate of the transmitter 104 is measured at the time immediately after the screen transfer is started, and the measured transmission rate is used as the transmission rate S and used in the above equation. In the example, it is assumed that $S=1.25\times10^6$ [unit: byte/s] is obtained as the measurement result.

It is assumed that 640×480 is the number of pixels of the whole screen, and it is assumed that 3 is the number of bytes per unit pixel. It is assumed that the guaranteed value RG (RG=500 [unit: millisecond]) of the response time is provided from the user through the GUI. The estimated value W of the processing start waiting time, which is returned from the estimation unit 106, is set to W=180 [unit: millisecond].

Under the above-described conditions, for example, the estimated value R of the response time is derived by the following equation (2) in the case of 0<Q≤40.

$$R = W + (G + D) + E + T = \qquad (2)$$

$$180 + 30 + (\text{the number of pixels of whole screen}) \times EA(Q) +$$

-continued $$(\text{data amount of whole screen}) \times CA(Q) \div S =$$
$$180 + 30 + (640 \times 480) \times ((0.25 \times Q + 5) \times 10^{\wedge}(-6)) +$$
$$(640 \times 480 \times 3) \times (0.5 \times Q \div 100) \div (1.25 \times 10^{\wedge}6 \div 10^{\wedge}3) =$$
$$3.763 \times Q + 211.5 \text{ [unit: millisecond]}$$

Figure 14:
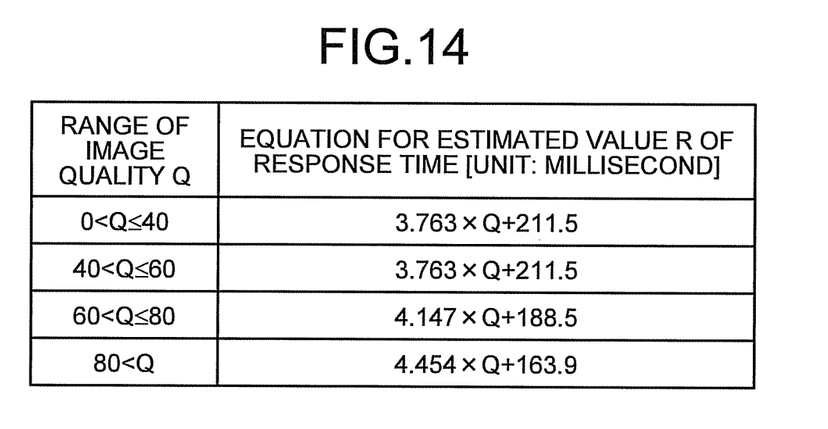
FIG. 14 is a diagram illustrating equations for an estimated value R of a response time.
Figure 15:
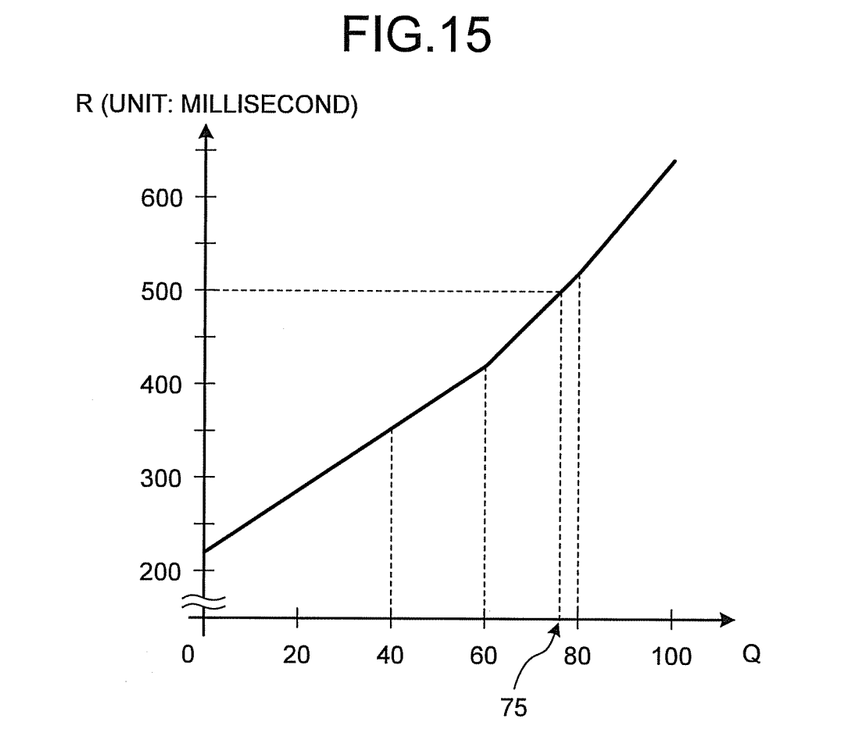
FIG. 15 is a graph illustrating equations of FIG. 14.

FIG. 14 is a diagram illustrating equations for the estimated value R of the response time, which is obtained by the equation (2). FIG. 15 is a graph illustrating equations of FIG. 14. The determination unit 107 determines the upper limit of the image quality, which satisfies RG=500 [unit: millisecond], from the equation for the estimated value R of the response time. As can be seen from FIG. 15, the image quality satisfying the RG=500 is Q=75.

Thus, the determination unit 107 determines the image quality. The determined image quality is retained in the storage region of the determination unit 107, and the determination unit 107 outputs the image quality every time the determination unit 107 receives the request to acquire the image quality from the compression unit 103. The image quality is updated by a new value every time the timer of the determination unit 107 is operated to re-calculate the image quality. The flow of the image quality determining processing performed by the determination unit 107 is described above.

According to the embodiment, the determination unit 107 determines the image quality while the elapsed time since the screen change corresponding to the user's manipulation is generated until the screen information including the screen change is acquired, namely, the processing start waiting time is included in the estimated value of the response time. In the related art, the processing start waiting time is not a factor that is considered in determining the image quality. In the embodiment, the relationship between the image quality and the response time can be correctly estimated, and therefore the upper limit of the image quality in which the response time is the predetermined value or less can be correctly determined. That is, the degradation of the image quality can be suppressed to the minimum level.

According to the embodiment, in estimating the processing start waiting time, the maximum difference between the transmission completion time and the acquisition start time in past times is selected, namely, the possibly maximum value is regarded as the processing start waiting time. Therefore, the requirement that the response time is suppressed to the predetermined value or less even if the screen change is generated by the manipulation in arbitrary timing can be achieved while the degradation of the image quality is suppressed to the minimum level.

According to the embodiment, in estimating the processing start waiting time, the average value of the differences between the transmission completion times and the acquisition start times in past times is regarded as the processing start waiting time. Therefore, the requirement that the average value of the response times is suppressed to the predetermined value or less in the situation, in which the screen change generated by the manipulation in arbitrary timing cannot be foreseen, can be achieved while the degradation of the image quality is suppressed to the minimum level.

According to the embodiment, in estimating the response time, the compression time and the transmission time are estimated using the number of pixels of the whole screen. Therefore, the requirement that the response time is suppressed to the predetermined value or less even if any screen change is generated can be achieved while the degradation of the image quality is suppressed to the minimum level.

According to the embodiment, in estimating the response time, the compression time and the transmission time are estimated using the average value of the numbers of pixels of the whole screens in past times. Therefore, the requirement that the average value of the response times is suppressed to the predetermined value or less in the situation, in which the number of pixels of the screen update does not largely fluctuate with time while what screen change is generated cannot be foreseen, can be achieved while the degradation of the image quality is suppressed to the minimum level.

According to the embodiment, when the screen information acquiring time, the difference extracting time, the compression time, and the transmission time are estimated, at least part of the time necessary for each piece of processing, the average compression time used in calculating each time, the average compression ratio, and the value of the transmission rate is obtained by the measurement. Therefore, adaptively the degradation of the image quality is suppressed to the minimum level while the response time is suppressed to the predetermined value or less in various situations in which processing performance of the server device or the quality of the network varies.

According to the embodiment, when the screen information acquiring time, the difference extracting time, the compression time, and the transmission time are estimated, at least part of the time necessary for each piece of processing, the average compression time used in calculating each time, the average compression ratio, and the value of the transmission rate is repeatedly calculated, and a new value is used. Therefore, adaptively the degradation of the image quality is suppressed to the minimum level while the response time is suppressed to the predetermined value or less, even if the processing performance of the server device varies because another application is concurrently operated in parallel, even if the quality of the network varies because of convergence of the networks, or even if the characteristics of the screen update vary because the application generating the screen change is changed.

As described above, according to the embodiment, a predetermined response time is obtained and the degradation of the image quality is suppressed to the minimum level.

Figure 16:
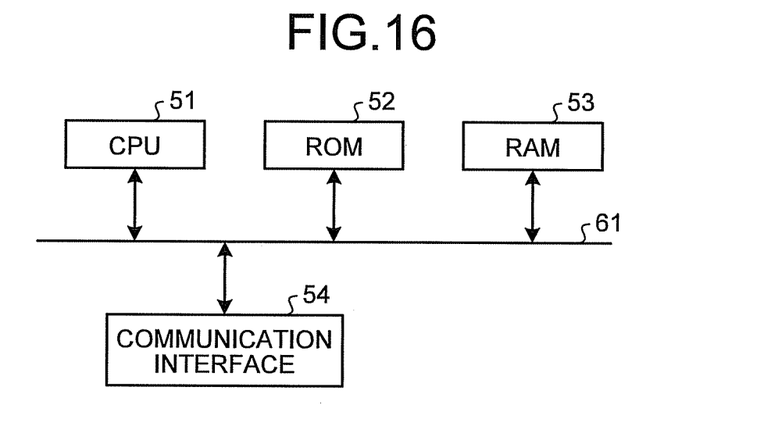
FIG. 16 is a diagram illustrating a hardware configuration of the server device.

A hardware configuration of the server device of the embodiment will be described with reference to FIG. 16. FIG. 16 is a diagram illustrating an example of the hardware configuration of the server device of the embodiment.

The server device of the embodiment includes a control device such as a CPU (Central Processing Unit) 51, a storage device such as a ROM (Read Only Memory) 52 and a RAM (Random Access Memory) 53, a communication interface 54 that is connected to the network to conduct the communication, an external storage device such as an HDD (Hard Disk Drive) and a CD (Compact Disc) drive, a display device such as a display, an input device such as a keyboard and a mouse, and a bus 61 that connects the devices. The server device has the hardware configuration in which a computer is usually utilized.

A server program executed in the server device of the embodiment is recorded as a file in the installable form or the executable form in a computer-readable recording medium such as a CD-ROM (Compact Disk Read Only Memory), a flexible disk (FD), a CD-R (Compact Disk Recordable), and a DVD (Digital Versatile Disk), and the server program is provided as a computer program product.

The server program executed in the server device of the embodiment may be configured to be stored in a computer connected to the network such as the Internet and provided by download through the network. The server program executed in the server device of the embodiment may be configured to be provided or distributed through the network such as the Internet.

The server program of the embodiment may be configured to be provided while incorporated in the ROM or the like.

The server program executed in the server device of the embodiment has a module configuration including the above-described units (the receiver, the acquisition unit, the difference extracting unit, the estimation unit, the determination unit, the compression unit, and the transmitter). In the actual hardware, the CPU 51 (processor) reads the server program from the storage medium to execute the server program, whereby each unit is loaded and generated on the main storage device.

While certain embodiments have been described, these embodiments have been presented by way of example only, and are not intended to limit the scope of the inventions. Indeed, the novel device and method described herein may be embodied in a variety of other forms; furthermore, various omissions, substitutions and changes in the form of the device and method described herein may be made without departing from the spirit of the inventions. The accompanying claims and their equivalents are intended to cover such forms or modifications as would fall within the scope and spirits of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A server device that is connected to a client device through a network, the client device displaying an image, the server device comprising:
  a receiver that receives manipulation information indicating a manipulation input to the client device from the client device;
  an acquisition unit that acquires a display image on which the manipulation information is reflected;
  a difference extracting unit that extracts a region where pixel information on a transmission image is not matched with pixel information on the display image, the transmission image being an image transmitted to the client device;
  an estimation unit that estimates an elapsed time since the manipulation information is received until the display image is acquired;
  a determination unit that determines image quality, for which a response time since the manipulation information is received until a response to the manipulation information is transmitted to the client device is a predetermined value or less, on the basis of the elapsed time;
  a compression unit that generates a compression image in which the image in the region is compressed with the determined image quality;
  a transmitter that transmits the compression image to the client device; and
  a history storage unit in which a history of the processing time is stored,
  wherein the estimation unit estimates the elapsed time on the basis of a processing time since the acquisition unit starts the acquisition of the display image reflecting the manipulation information received in past until the transmitter completes the transmission of the compression image corresponding to the display image to the client device, and
  the estimation unit estimates the elapsed time on the basis of the processing time stored in the history storage unit.

2. The server device according to claim 1, wherein the estimation unit sets a maximum value of the processing time stored in the history storage unit as an estimated value of the elapsed time.

3. The server device according to claim 1, wherein the estimation unit sets an average value of the processing time stored in the history storage unit as an estimated value of the elapsed time.

4. A communication method comprising:
  receiving manipulation information indicating a manipulation input to a client device from the client device;
  acquiring a display image on which the manipulation information is reflected;
  extracting a region where pixel information on a transmission image is not matched with pixel information on the display image, the transmission image being an image transmitted to the client device;
  estimating an elapsed time since the manipulation information is received until the display image is acquired;
  determining image quality, for which a response time since the manipulation information is received until a response to the manipulation information is transmitted to the client device is a predetermined value or less, on the basis of the elapsed time;
  generating a compression image in which the image in the region is compressed with the determined image quality;
  transmitting the compression image to the client device; and
  storing a history of the processing time,
  wherein estimating the elapsed time on the basis of a processing time since starting the acquiring of the display image reflecting the manipulation information received in past until completing transmitting the compression image corresponding to the display image to the client device, and
  estimating the elapsed time on the basis of the processing time.

5. A program product having a non-transitory computer readable medium including programmed instructions, wherein the instructions, when executed by a computer connected through a network to a client device displaying an image, cause the computer to perform:
  receiving manipulation information indicating a manipulation input to a client device from the client device;
  acquiring a display image on which the manipulation information is reflected;
  extracting a region where pixel information on a transmission image is not matched with pixel information on the display image, the transmission image being an image transmitted to the client device;
  estimating an elapsed time since the manipulation information is received until the display image is acquired;
  determining image quality, for which a response time since the manipulation information is received until a response to the manipulation information is transmitted to the client device is a predetermined value or less, on the basis of the elapsed time;

generating a compression image in which the image in the region is compressed with the determined image quality;

transmitting the compression image to the client device; and storing a history of the processing time, wherein estimating the elapsed time on the basis of a processing time since starting the acquiring of the display image reflecting the manipulation information received in past until completing transmitting the compression image corresponding to the display image to the client device, and estimating the elapsed time on the basis of the processing time.

* * * * *